United States Patent
Nilsen

(10) Patent No.: US 8,016,534 B2
(45) Date of Patent: Sep. 13, 2011

(54) FASTENER ASSEMBLY AND MANUFACTURING METHOD THEREFOR

(75) Inventor: Martin J. Nilsen, Hampshire, IL (US)

(73) Assignee: Illinois Tool Works Inc., Glenview, IL (US)

( * ) Notice: Subject to any disclaimer, the term of this patent is extended or adjusted under 35 U.S.C. 154(b) by 841 days.

(21) Appl. No.: 11/890,049

(22) Filed: Aug. 3, 2007

(65) Prior Publication Data

US 2008/0067811 A1    Mar. 20, 2008

Related U.S. Application Data

(60) Provisional application No. 60/845,328, filed on Sep. 18, 2006.

(51) Int. Cl.
*F16B 19/00* (2006.01)

(52) U.S. Cl. .......... 411/360; 411/22; 411/217; 411/362; 411/388; 411/389

(58) Field of Classification Search ................. 411/360, 411/501, 9, 22, 71, 80.6, 111–113, 121, 165, 411/319, 323, 334, 362, 388–389, 479, 506, 411/508–510, 541, 549, 924.1, 929.2, 937, 411/967–969, 972, 21, 69, 217, 325, 395–396, 411/412–413, 32
See application file for complete search history.

(56) References Cited

U.S. PATENT DOCUMENTS

| | | | |
|---|---|---|---|
| 2,784,636 A * | 3/1957 | Bohmer | 411/64 |
| 2,887,694 A * | 5/1959 | Sauter | 470/30 |
| 3,031,049 A * | 4/1962 | Somville | 52/656.6 |
| 3,055,100 A * | 9/1962 | Kimpel | 29/520 |
| 4,435,112 A * | 3/1984 | Becker | 411/368 |
| 4,615,655 A * | 10/1986 | Dixon | 411/339 |
| 4,952,106 A * | 8/1990 | Kubogochi et al. | 411/48 |
| 5,850,676 A * | 12/1998 | Takahashi et al. | 24/297 |
| 2005/0123372 A1* | 6/2005 | Sato | 411/32 |

FOREIGN PATENT DOCUMENTS

GB    543797    3/1942

OTHER PUBLICATIONS

International Search Report and Written Opinion for PCT/US07/76603.

* cited by examiner

*Primary Examiner* — Robert Sandy
*Assistant Examiner* — Roberta Delisle
(74) *Attorney, Agent, or Firm* — Mark W. Croll; Paul F. Donovan

(57) ABSTRACT

A connector includes an elongated hollow body and a nut threaded onto the body. The nut is secured in place by outward expansion of material from the threaded body into a chamfer of the nut.

13 Claims, 3 Drawing Sheets

FASTENER ASSEMBLY AND MANUFACTURING METHOD THEREFOR

CROSS-REFERENCE TO RELATED APPLICATIONS

The present regular U.S. Patent Application claims the benefits of U.S. Provisional Application for Patent Ser. No. 60/845,328, filed on Sep. 18, 2006.

FIELD OF THE INVENTION

The present invention relates generally to fastener assemblies and connectors, and, more particularly, the invention pertains to a connector assembly including an elongated hollow member with a nut-like flange for engagement by tools to rotate the connector.

BACKGROUND OF THE INVENTION

Elongated threaded fasteners or connectors are known to have external threads at one or both ends and a flange section intermediate the ends in a hex configuration similar to a nut by which the fastener can be rotated. For example, FIGS. 1, 2 and 3 illustrate prior art connectors for an oil cooler installation in an automobile. The connector is a one-piece body 10 including threaded portions 12, 14 at opposite ends thereof which may cover the entire surface of a cylindrical portion of body 10, or only parts thereof as necessary for the final installation and use. A flange 16 is provided between threads 12 and 14, and in the exemplary embodiment of the prior art includes a washer portion 18 and a nut-like hex portion 20 by which connector 10 can be engaged with tools such as wrenches for rotating the connector.

As known in the prior art, connector 10 is formed as a one-piece body in a cold forming technique. The connector is adapted to mate with two mating components, with a first component 22 threadedly received on threads 12 and the second component (not shown) threadedly received on threads 14. Hex portion 20 is used to rotate the connector with a tool (not shown) when assembling the connector to one or both of the components.

After cold forming the basic shape of the connector, threads 12 and 14 are machined at opposite ends. When machining thread 12 adjacent hex portion 20, given the manufacturing process, the thread cannot be threaded all the way to the top of the hex. An intermediate segment 24 remains, which is not threaded and is of a diameter slightly larger than the root diameter between threads of the threaded portion. A chamfer-like curved portion 24 remains between the end of the thread and the top of the hex formation. The chamfer is the result of not being able to generate a complete thread against a wall of material, such as the top of the hex formation. Accordingly, without removing the chamfer or radius, the mating part, which typically does not include a lead-in chamfer, does not fit tightly against the hex because of the interference of the chamfer or radius portion 24.

Solutions for the above described problem have been addressed in two different ways. As illustrated in FIG. 2, a washer 26 can be interposed between the confronting surfaces of hex portion 20 and first component 22. Washer 26 is of sufficient thickness to fill the axial distance equivalent to the height of chamfer portion 24. While solving the problem of establishing a tight connection between connector 10 and component 22, the use of a washer adds an additional part to the assembly, increasing costs, extending assembly time and creating a source of possible improper assembly if washer 26 is omitted inadvertently.

FIG. 3 illustrates another known solution in the prior art to allow tight assembly of component 22 against hex portion 20 on connector 10. The chamfer portion 24 is machined away to provide an undercut 28 between the last thread 12 and the surface of hex portion 20. While not shown for reasons of clarity in FIG. 3, component 22 can be threaded tightly against the end surface of hex portion 20 in the structure of FIG. 3. This solves the problem but adds undesirable manufacturing cost to component 10 by requiring an additional machining step.

What is needed is a connector that can be manufactured efficiently and cost-effectively by known manufacturing techniques and that can be installed in a final assembly quickly and easily.

SUMMARY OF THE INVENTION

The present invention addresses the problem noted above by providing a one-piece connector formed from two components in the manufacturing process in a cost efficient manner using known techniques, whereby a full thread is provided all the way to the surface of the hex portion used for rotating the connector.

In one aspect of one form thereof, the present invention provides a method for making a threaded connector having an elongated hollow body with an external thread at an end and a radially projecting portion adjacent the thread. The method has steps of providing an elongated body and a nut having a chamfer; forming the elongated body with an axial opening having an inward material projection; threading an outer surface of the elongated body including a portion thereof radially outward of the inward material projection; engaging the nut onto the thread on the body; establishing a position of the nut with the chamfer radially outward of the inward material projection; and forcing the inward material projection outwardly, and thereby forming a protuberant outward projection of the body into the chamfer of the nut.

In another aspect of another form thereof, the present invention provides a threaded connector with an elongated hollow body having an external thread and a nut threaded onto the thread of the elongated body. The nut has a chamfer, and a protuberant outward projection of the body extends into the chamfer of the nut.

In a still further aspect of yet another form thereof, the present invention provides a threaded connector with an elongated hollow body having an external thread and a shoulder at an inner end of the thread. A nut is threaded onto the thread of the body. The nut has chamfers at opposite ends thereof. One of the chamfers receives the shoulder therein, and the other of the chamfers receives a protuberant outward projection of the body.

An advantage of one form of the present invention is providing a hollow threaded connector having a tool engaging flange against which a component can be engaged tightly.

Another advantage of the present invention, in another form thereof, is providing a threaded connector that can be manufactured in a cost efficient manner.

Yet another advantage of the present invention, in yet another form thereof, is providing a connector installed as one piece component without the need for washers or the like.

Other features and advantages of the invention will become apparent to those skilled in the art upon review of the following detailed description, claims and drawings in which like numerals are used to designate like features.

Figure 1:
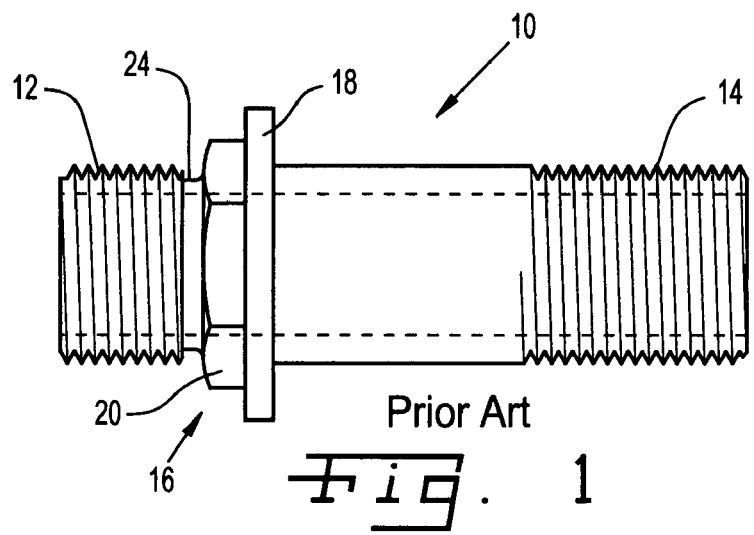
FIGS. 1, 2 and 3 are illustrations of prior art connectors.
Figure 2:
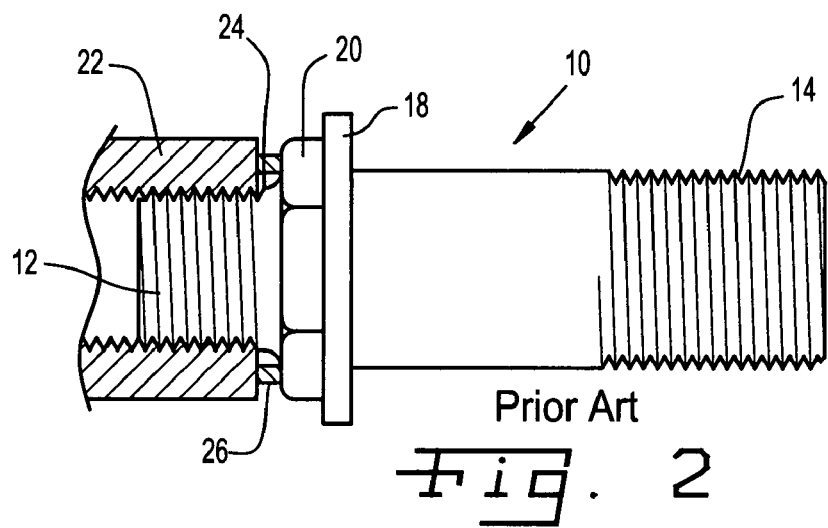
Figure 3:
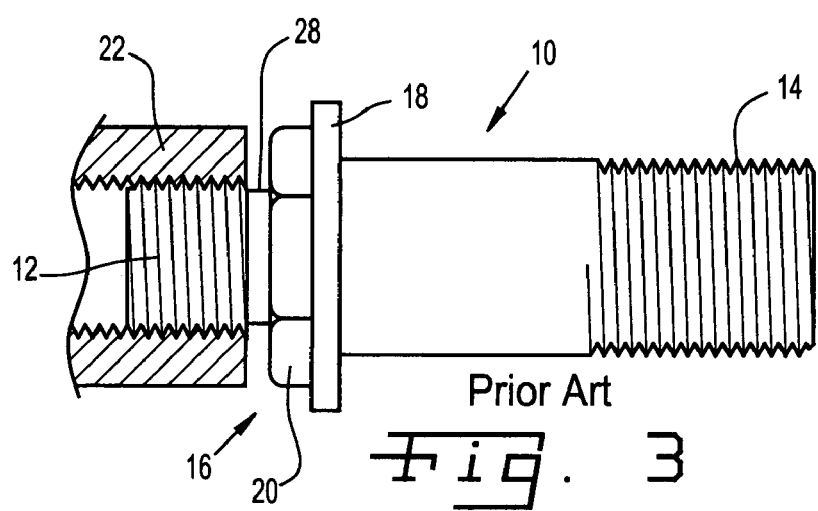

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Figure 4:
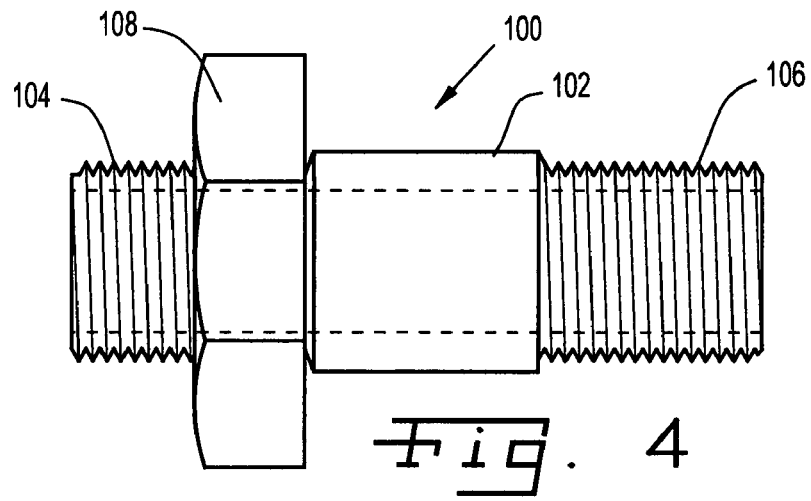
FIG. 4 is a side elevational view of a connector in accordance with the present invention.
Figure 5:
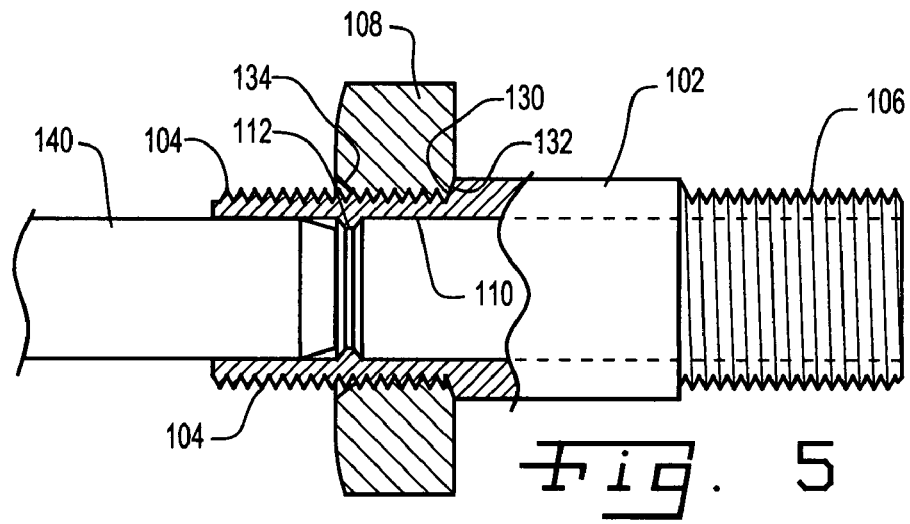
FIG. 5 is a partially cross-sectional view of the connector shown in FIG. 4, illustrating the connector at an early stage in the manufacturing process.
Figure 6:
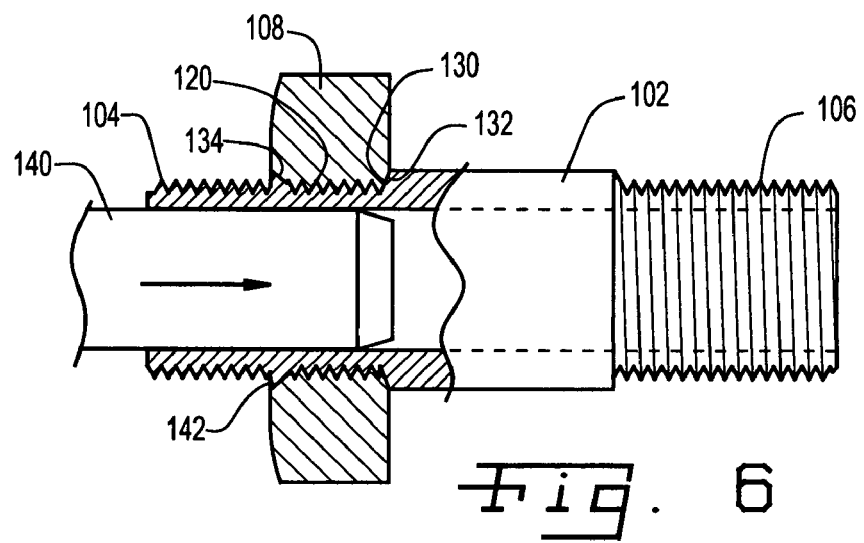
FIG. 6 is a cross-sectional view similar to that of FIG. 5, but illustrating the connector at a later stage of the manufacturing process.

Referring now more specifically to the drawings and to FIGS. 4, 5 and 6 in particular, a connector 100 of the present invention is shown. Connector 100 includes an elongate tubular, hollow body 102 having threads 104 and 106 at opposite ends thereof. A hex nut 108 is disposed on threads 104 and is tightly secured in place whereby connector 100 can be rotated via a tool (not shown) engaged on the hex shaped outer configuration of nut 108.

During manufacture and assembly, body 102 is cold formed by known techniques to have an axial opening 110 therethrough. In the initial formation of axial opening 110, an inward material projection 112 remains in axial opening 110, which maybe a body or bodies, and may be a continuous ring projecting inwardly from the inner surface defining axial opening 110. Threads 104, 106 are formed by machining or the like at the opposite ends of body 102. While the exemplary embodiment illustrates an unthreaded portion remaining between threaded ends 104, 106 it should be understood that the threads can extend substantially the entire length of body 102 without a significant unthreaded portion remaining between threads 104, 106. Further, body 102 can be formed with a single thread at one end, and the thread or threads can be of different styles or shapes than that shown. Known thread forming techniques can be used to extend threads 104, 106 the desired lengths inwardly from opposite ends of body 102.

During formation of a standard nut such as nut 108, it is known to provide a lead-in chamfer at each end of the nut leading into nut thread 120. The chamfer zones ease assembly to mating threads of a bolt, threaded stud or other threaded component by directing the alignment of the nut on the threaded component to which it is engaged.

Figure 8:
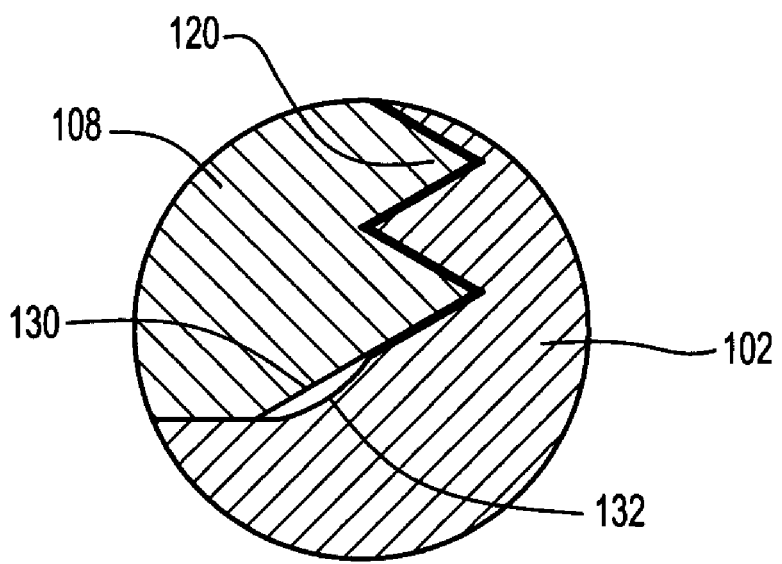
FIG. 8 is an enlarged fragmentary cross-sectional view of a connector in accordance with the present invention.

In the assembly of connector 100, as thread 120 of nut 108 is advanced the full extent of thread 104, a chamfer 130 of nut 108 fits tightly against a shoulder 132 established at the inner end of thread 104 when thread 104 is formed. FIG. 8 is an enlarged cross-sectional view illustrating the manner in which a chamfer 130 receives the shoulder area 132 remaining from thread formation.

A chamfer 134 at the opposite face of nut 108 from chamfer 130 is aligned radially outwardly of inward material projection 112 within axial opening 110. After the nut is positioned tightly against shoulder 132, a punch 140 is forced through axial opening 110. Punch 140 substantially fills axial opening 110 in the larger diameter areas away from projection 112. Punch 140 is shaped to engage material projection 112 so as to force the projection outwardly, as punch 140 is pushed past projection 112 as indicated by the arrow on punch 140. Accordingly, deformation of projection 112 occurs, and material is moved radially outwardly such that the outer surface of body 102 is moved outwardly, forming a protuberant outward projection 142 (FIG. 6) in the shape of a ring 142 expanded into the confronting chamfer area 134 of nut 108. Protuberant outward projection 142 extends a radial distance beyond nut thread 120, whereby nut 108 can not be threaded there past. Axial opening 110 is substantially smooth and continuous throughout the length of body 102 upon withdrawal of punch 140 therefrom.

By moving the material and adjacent threads outwardly into chamfer 134 of nut 108 nut 108 is staked to body 102 so as to essentially become a one-piece assembly with the body. The nut is constrained between shoulder 132 at one end and the outwardly expanded protuberant projection 142 at the opposite end. As a result of this assembly, thread 104 extends out of nut 108 and is fully available for engaging the threads of the mating part, such as component 22, completely to the confronting surface of nut 108. The mating part can then be threaded tightly onto thread 104 and against the confronting surface of nut 108 without the need for an intervening washer.

The staking operation to affix nut 108 in place by inserting punch 140 through axial opening 110 is a simple material forming process that can be handled more efficiently and economically then machining away a chamfered portion remaining at the end of a thread on a connector of the prior art as described previously. The present manufacturing process for connector 100 establishes a one piece connector assembly that can be installed quickly and efficiently without the need for a washer or other intervening body, the assembly of which can lead to errors. Accordingly, the present invention provides a process for manufacturing a connector in a cost-effective manner, and provides a connector that promotes efficient and proper installation in the final assembly.

Figure 7:
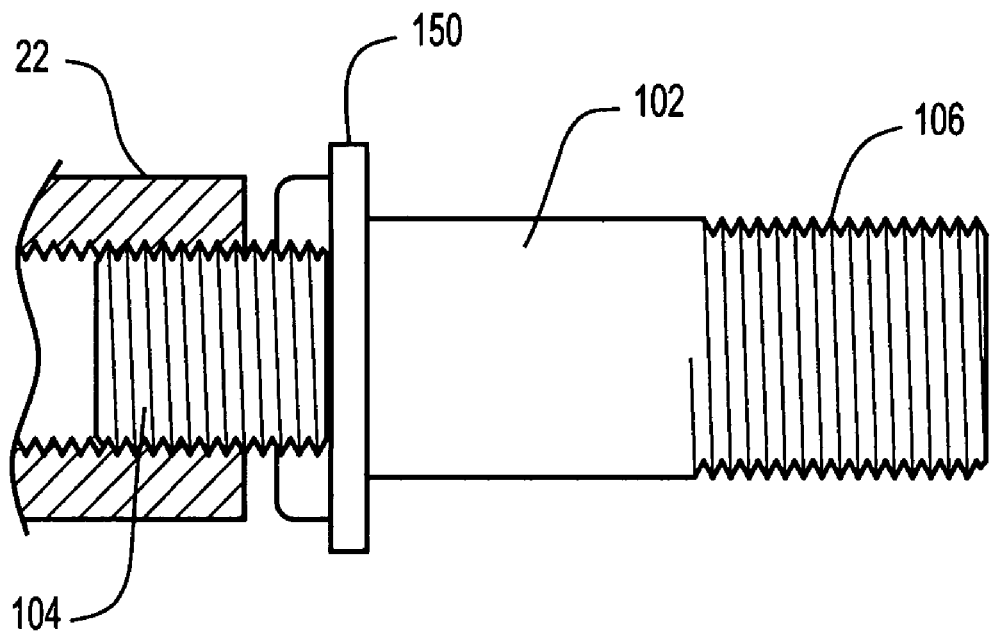
FIG. 7 is a side view of a further embodiment of the present invention.

In an alternate embodiment as shown in FIG. 7, a flanged nut 150 can be used, to provide a radially extending flange if required. It should be understood that in still other embodiments, a nut can be positioned at an intermediate point along a thread and staked in place by the outward expansion of material into one chamfer of the nut or into both chamfers of the nut, at opposite ends. Further, while a nut having a hex configuration is shown, it should be understood that other peripheral shapes also can be used. The hex configured nut is merely exemplary.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A threaded connector comprising:
an elongated hollow body having a first end, a second end and an external thread, said hollow body having a non-threaded inner surface with an inward projection located between said first and second ends and extending from said inner surface;
a nut threaded onto said thread of said elongated body, said nut having a chamfer and a confronting surface; and
a protuberant outward projection of the body extended into said chamfer of said nut, said protuberant outward projection created by outward deformation of said inward projection that is located on the inner surface of the body, so as to stake said nut to said body, whereby said external thread extends outward of said nut so as to be fully available for engaging a thread of a mating part completely to said confronting surface of said nut.

2. The connector of claim 1, said body having a shoulder at an end of said thread, and said nut being engaged against said shoulder of said body.

3. The connector of claim 2, said elongated body having threads at both ends thereof.

4. The connector of claim 1, said elongated hollow body having first and second threads at opposite ends thereof.

5. The connector of claim 1, said nut being a flanged nut.

6. The connector of claim 1, said protuberant outward projection being a substantially continuous ring.

7. The connector of claim 1, said nut having a nut thread engaged on said thread of said elongated body, and said nut further having chamfers at both ends of said nut thread.

8. The connector of claim 7, one of said nut chamfers receiving a shoulder at an end of said thread of said elongated body, and the other of said chamfers receiving said protuberant outward projection.

9. A threaded connector comprising:
an elongated hollow body having an external thread and a shoulder at an inner end of said thread, said hollow body further having a non-threaded inner surface with an inward projection extending from said inner surface, said inward projection being located between an outer end of said thread and said inner end of said thread;
a nut threaded onto said thread of said elongated body, said nut having chamfers at opposite ends thereof, one of said chamfers receiving said shoulder therein said nut further having a confronting surface; and
a protuberant outward projection of said body extended into the other of said chamfers of said nut, said protuberant outward projection created by outward deformation of said inward projection that is located on the inner surface of the body, so as to stake said nut to said body, whereby said outer end of said external thread extends outward of said nut so as to be fully available for engaging a thread of a mating part completely to said confronting surface of said nut.

10. The connector of claim 9, said protuberant outward projection comprising a substantially continuous protuberant ring.

11. The connector of claim 10, said elongated hollow body having a substantially smooth continuous axial opening extending therethrough.

12. The connector of claim 9, said elongated hollow body having a substantially smooth continuous axial opening extending therethrough.

13. The connector of claim 9, said body having first and second external threads at opposite ends thereof.

* * * * *